ð US010798425B1

(12) United States Patent
Chen et al.

(10) Patent No.: US 10,798,425 B1
(45) Date of Patent: Oct. 6, 2020

(54) PERSONALIZED KEY OBJECT IDENTIFICATION IN A LIVE VIDEO STREAM

(71) Applicant: International Business Machines Corporation, Armonk, NY (US)

(72) Inventors: Di Ling Chen, Beijing (CN); Shi Su, Beijing (CN); Wu Mi Zhong, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/362,678

(22) Filed: Mar. 24, 2019

(51) Int. Cl.
*H04H 60/33* (2008.01)
*H04N 21/2187* (2011.01)
*G06K 9/00* (2006.01)
*H04N 21/258* (2011.01)
*H04N 21/442* (2011.01)
*G06F 40/205* (2020.01)
*G06F 40/279* (2020.01)

(52) U.S. Cl.
CPC ....... *H04N 21/2187* (2013.01); *G06F 40/205* (2020.01); *G06F 40/279* (2020.01); *G06K 9/00302* (2013.01); *G06K 9/00718* (2013.01); *H04N 21/25841* (2013.01); *H04N 21/44222* (2013.01)

(58) Field of Classification Search
CPC .......... H04N 21/4532; H04N 21/4788; H04N 21/44218; H04N 21/4223; H04N 21/44222; H04N 21/812; H04N 21/23418; H04N 21/25891; H04N 21/42201; H04N 21/4667
See application file for complete search history.

(56) References Cited

U.S. PATENT DOCUMENTS

| 10,149,008 B1* | 12/2018 | Logan .............. H04N 21/44218 |
| 10,390,064 B2* | 8/2019 | Dury ....................... A63F 13/49 |
| 2003/0097301 A1* | 5/2003 | Kageyama ............. G06Q 30/02 705/14.52 |
| 2009/0195392 A1 | 8/2009 | Zalewski |

(Continued)

OTHER PUBLICATIONS

Anonymous, "A Method and System to Automatically Collect User's Emotion and Tag Content," an IP.com Prior Art Database Technical Disclosure, IP.com No. IPCOM000242982D, published Sep. 4, 2015, 5 pgs.

*Primary Examiner* — Jason Salce
(74) *Attorney, Agent, or Firm* — Peter K. Suchecki

(57) ABSTRACT

Embodiments of the invention provide a method, system and computer program product for personalized key object detection in a live video stream. The method includes streaming a live video stream in a window of a computing device and during the streaming, collecting biophysical data of an end user viewing the playing back and responding to ones of the collected biophysical data that indicate a positive reaction by associating a contemporaneously displayed frame of the live video stream with the positive reaction. Thereafter, each corresponding frame associated with positive feedback can be processed by identifying key words presented in text of the feedback to the corresponding frame, matching the identified key words to a tag of an object visually presented in the corresponding frame, and storing a reference to the object in connection with the end user as an object of interest for which targeted marketing may be presented.

18 Claims, 2 Drawing Sheets

(56) References Cited

U.S. PATENT DOCUMENTS

| | | |
|---|---|---|
| 2011/0225515 A1 | 9/2011 | Goldman et al. |
| 2012/0030713 A1* | 2/2012 | Begeja ................ H04N 21/235 |
| | | 725/53 |
| 2012/0324491 A1 | 12/2012 | Bathiche et al. |
| 2014/0317646 A1* | 10/2014 | Garza .............. H04N 21/44218 |
| | | 725/12 |
| 2015/0341692 A1 | 11/2015 | Conrad et al. |
| 2015/0347903 A1 | 12/2015 | Saxena et al. |
| 2016/0109941 A1 | 4/2016 | Govindarajeswaran et al. |
| 2017/0178692 A1* | 6/2017 | Wouhaybi .............. G11B 27/34 |

* cited by examiner

PERSONALIZED KEY OBJECT IDENTIFICATION IN A LIVE VIDEO STREAM

BACKGROUND OF THE INVENTION

Field of the Invention

The present invention relates to the field of emotional response detection during a video media presentation and more particularly to object detection in a video media presentation.

Description of the Related Art

The Internet has created an environment in which nearly unlimited amounts of content may be published for viewing by countless viewers in so many different forms including static text and imagery, and also video imagery. As a medium through which goods or services may be promoted for sale, the Internet and especially the World Wide Web provides a nearly limitless canvas by way of which marketing messages may be delivered to awaiting prospective consumers. Even still, the effective use of the Internet as a marketing vehicle is not without cost.

In this regard, the nearly limitless canvas of both the World Wide Web and also private applications accessible through the Internet, is tempered by the private management of Web sites through which marketing messages may be delivered and by which, fees are leveled for advertisers seeking access to the end users of the Web sites. As a general rule, the more likely it is that a subscriber will view a marketing message on a Web site or through an Internet accessible application, the more expensive the fee will be assessed by the publisher of the Web site or host of the Internet accessible application. Thus, one must be strategic in selecting which marketing content to provide to which end user through which Internet accessible application or Web site.

With the ever-expanding bandwidth available to end users interacting with network distributable content, video imagery has become a prime medium through which marketing material may be presented. Paramount to successfully delivering marketing content through video imagery is the ability to detect an emotional response by a viewer of the video imagery. To that end, it is known to sense the physical feedback of the end user during the viewing by the end user of the video content in order to compute the impact of the message contained within the video imagery. To wit, the detected physical feedback may come in the form of eye-gaze tracking, facial expression tracking, laugh detection and the like.

BRIEF SUMMARY OF THE INVENTION

Embodiments of the present invention address deficiencies of the art in respect to the intelligent distribution of video imagery for marketing and provide a novel and non-obvious method, system and computer program product for personalized key object detection in a live video stream. In an embodiment of the invention, a method for personalized key object detection in a live video stream includes streaming a live video stream in a window of a computing device and during the streaming, collecting biophysical data of an end user viewing the playing back, such as a heartbeat or facial expression of the end user, and responding to ones of the collected biophysical data that indicate a positive reaction by associating a contemporaneously displayed frame of the live video stream with the positive reaction. Thereafter, each corresponding frame associated with positive feedback can be processed by identifying key words presented in text of the feedback to the corresponding frame, matching the identified key words to a tag of an object visually presented in the corresponding frame, and storing a reference to the object in connection with the end user as an object of interest for which targeted marketing may be presented.

In one aspect of the embodiment, the key words of the corresponding frame are determined by parsing the text of the feedback, computing a frequency of presence in the text of a set of words, and selecting as key words, only those in the set having a corresponding frequency that exceeds a threshold value. In this regard, the key words may be selected only in respect to those in the set that both have a corresponding frequency that exceeds a threshold value and also that match data in a pre-stored profile of the end user. In another aspect of the embodiment, the contemporaneously displayed frame of the live video stream is associated with the positive reaction by applying a time stamp to the positive reaction and correlating the time stamp to a time location in the live video stream. In yet another aspect of the embodiment, for the object of interest, the corresponding frame may be image processed to identify a brand identification of the object of interest so as to store the brand identification along with the stored reference to the object in connection with the end user as an object of interest for which targeted marketing may be presented.

In another embodiment of the invention, a data processing system is configured for personalized key object detection in a live video stream. The system includes a host computing platform that includes one or more computers, each with memory and at least one processor, and a media player executing in the memory of the host computing platform steaming a live video stream. The system additionally includes a personalized key object detection module coupled to the media player. The module includes computer program instructions operable during execution in the memory of the host computing platform to perform during the streaming, the collection of biophysical data of an end user viewing the streaming and the response to ones of the collected biophysical data that indicate a positive reaction by associating a contemporaneously displayed frame of the live video stream with the positive reaction. The program instructions are further operable to process each corresponding frame associated with positive feedback by identifying key words presented in text of the feedback to the corresponding frame, matching the identified key words to a tag of an object visually presented in the corresponding frame, and storing a reference to the object in connection with the end user as an object of interest for which targeted marketing may be presented.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for personalized key object detection in a live video stream. In accordance with an embodiment of the invention, biophysical data of an end user viewing video imagery is collected while the end user views the video imagery. To the extent that the biophysical data indicates a positive emotional reaction by the end user, a time stamp is recorded of the positive emotional reaction in connection with one or more frames of the video imagery presented at the time indicated in the time stamp. The, user contribute text commentary regarding the frames is retrieved, parsed and statistically analyzed to filter the text to only those words of the text appearing with a threshold frequency. Each of the words of the filtered text are then compared to tags for visual objects in the frames and at least one visual object with a tag matching one of the words of the filtered text is the recorded as an object of interest of the user. In this way, targeted marketing pertaining to the object of interest may be presented to the end user.

Figure 1:
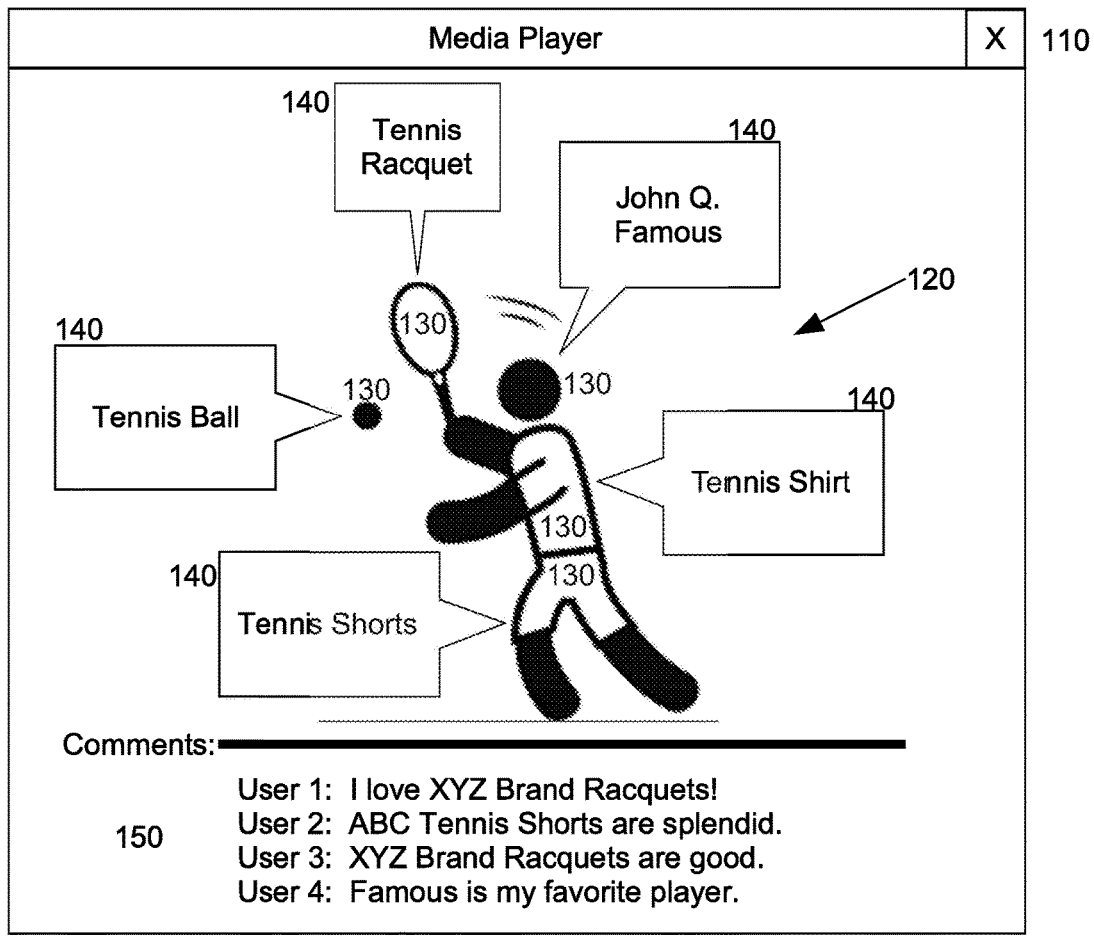
FIG. 1 is a pictorial illustration of a process for personalized key object detection in a live video stream.
Figure 1:
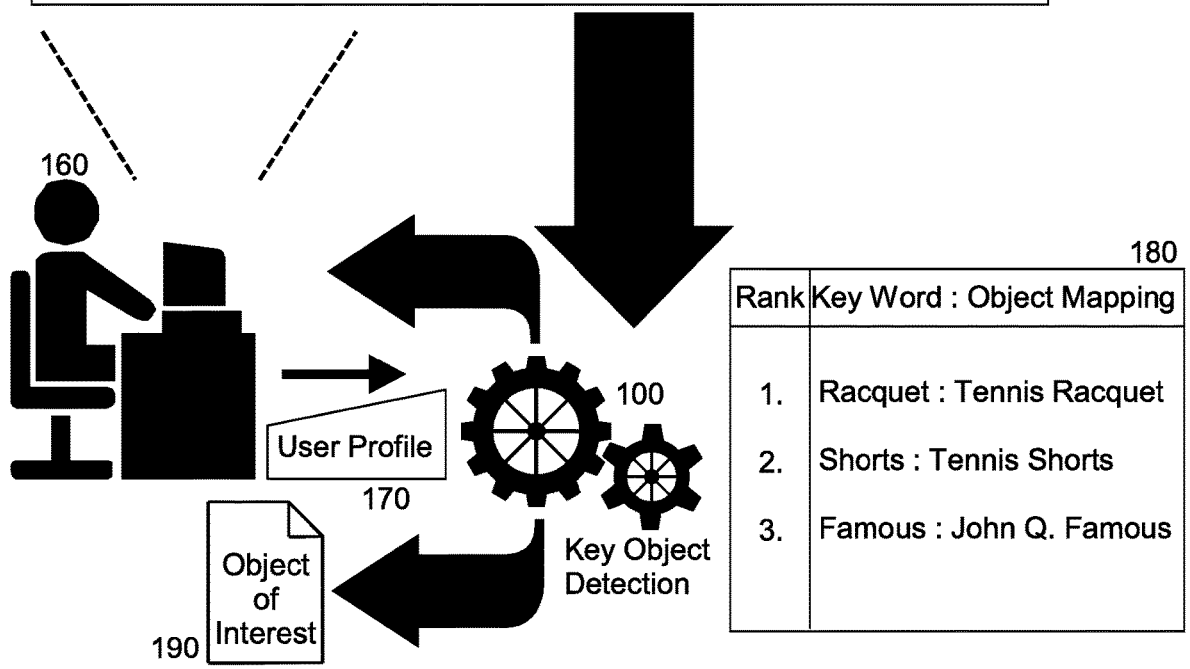

In further illustration, FIG. 1 is a pictorial illustration of a process for personalized key object detection in a live video stream. As shown in FIG. 1, video imagery 120 streams in a media player 110 of an end user 160. The video imagery 120 includes a multiplicity of objects 130 such as an individual engaging in actions in the video imagery 120, clothing and accessories worn by the individual, and equipment utilized by the individual while engaging in the actions. Each of the objects 130 includes corresponding meta-information 140 such as a tag, describing a corresponding one of the objects 130. The video imagery 120 also includes textual commentary 150 pertaining to the objects 130 and provided by different viewers of the video imagery 120.

Key object detection logic 100 monitors biophysical data detected in respect to the end user 160, such as a heart rate of the end user 160, a facial expression of the end user 160, or an eye gaze of the end user 160. Key object detection logic 100 then responds to a positive emotional response by the end user 160 indicated by the biophysical data by retrieving the textual commentary 150 and parsing the substantive words of the textual commentary 150 in order to compute a frequency of appearance of each of the words in the textual commentary 150. Those of the words having a threshold frequency are then located in mapping 180 to the different tags 140 of the video imagery 120 in order to determine an object of interest 190 of the end user 160 within the video imagery 120. Optionally, the words can be further filtered to a smaller subject by including only those words matching profile information in a user profile 170 of the end user 160.

Figure 2:
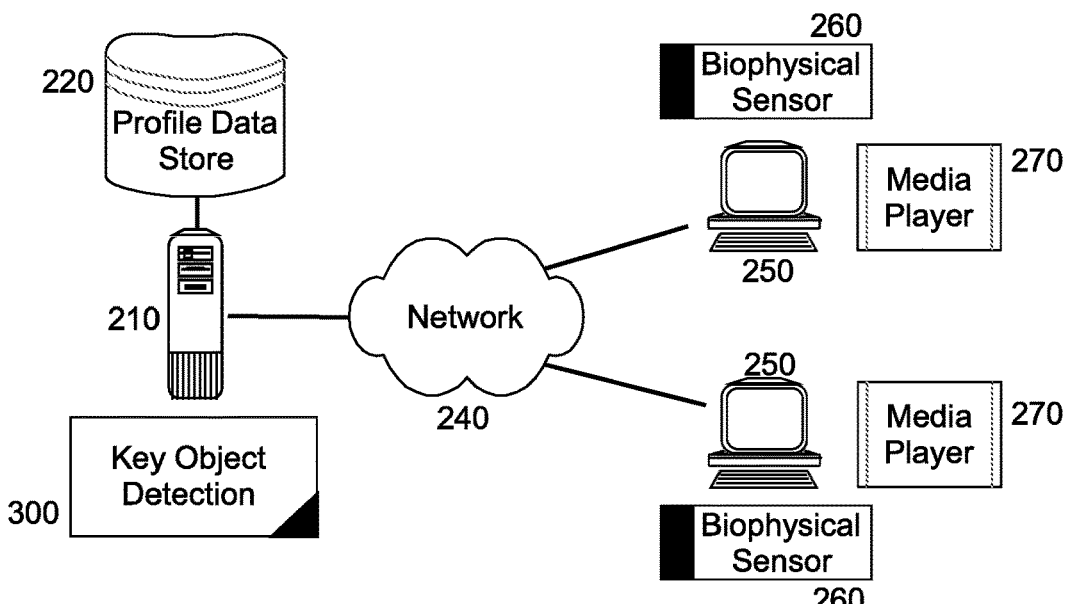
FIG. 2 is a schematic illustration of a data processing system configured for personalized key object detection in a live video stream; and, FIG. 3 is a flow chart illustrating a process for personalized key object detection in a live video stream.

The process described in connection with FIG. 1, may be implemented in a data processing system. In further illustration, FIG. 2 schematically shows a data processing system configured for personalized key object detection in a live video stream. The system includes a host computing platform 210 that includes one or more computers, each with memory and at least one processor. The host computing platform 210 is communicatively coupled to different client computers 250 over computer communications network 240. Each of the client computers 250 includes a media player 270 adapted to display streaming media therein streamed from over the computer communications network 240, and also a biophysical sensing system 260 adapted to sense biophysical data of an end user, such as a heart rate, a facial expression or a direction of a gaze as in a gaze tracking system.

Of note, the system includes a key object detection module 300. The key object detection module 300 includes computer program instructions enabled during execution in the memory of the host computing platform 210 to receive biophysical data of different end users at different, respective ones of the client computers 250 as the different end users view streaming video within corresponding ones of the media players 270. The biophysical data in particular is determined from time to time, to reflect a positive reaction as between an end user and a portion of the streaming video. As such, as it is determined that the biophysical data received from over the computer communications network 240 indicates a positive response to a portion of the streaming video, the program instructions of the module 300 record a timestamp in respect to the streaming video and the end user.

The program instructions of the key object detection module 300 then processes the timestamps to identify frames of the streaming video associated with the positive responses by the end users and process companion text for the frames in order to identify a most frequent set of one or more words in the companion text. The program instructions of the key object detection module 300 further filter those words in the most frequent set to only those words mapping to one or more profile values of a corresponding end user stored in profile data store 220, such as demographic data or user preferences. Then, the program instructions of the key object detection module 300 map those remaining words to meta-data for one or more objects present in the streaming video so as to store in the profile data store 220, one or more objects determined to be of interest to the end user. As such, targeted marketing can be formulated for the end user based upon the objects of interest stored in association with the end user.

Figure 3:
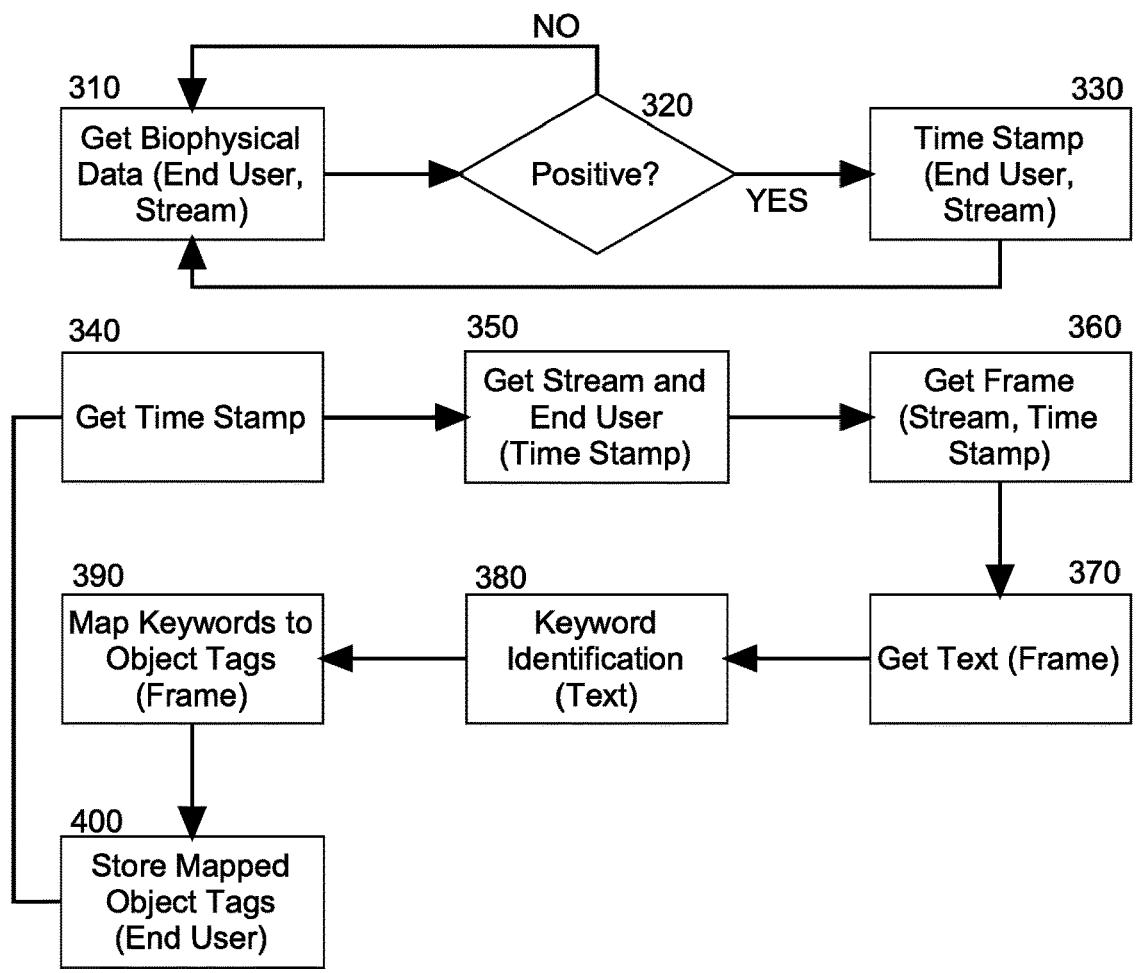

In even yet further illustration of the operation of the key object detection module 300, FIG. 3 is a flow chart illustrating a process for personalized key object detection in a live video stream. Beginning in block 310, biophysical data is received in connection with an end user and streaming video. In block 320, it is determined whether or not the biophysical data indicates a positive response by the end user to the streaming video. If so, in block 330, a timestamp is created in memory in respect to the end user and the streaming video. The process then continues in block 310 for additional biophysical data from the same end user or other end users in respect to the same streaming video or other streaming video.

In block 340, a first timestamp is retrieved from the memory and in block 350, an end user and streaming video is identified in respect to the time stamp. In block 360, a frame corresponding to the timestamp is identified and in block 370, textual commentary associated with the frame is retrieved into memory. In block 380, one or more keywords are identified in the textual commentary. In this regard, a frequency of utilization of each of the substantive words of the textual commentary (excluding articles and pronouns, for example) is computed. A set of the words enjoying a threshold frequency are then mapped to the tags for one or more objects in the frame are identified in block 390. Finally, in block 400 the objects mapped to the keywords are stored in connection with the end user so as to indicate objects of interest to the end user suitable for formulating marketing messaging to the end user in the future.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for personalized key object detection in a live video stream, the method comprising:
   streaming a live video stream in a window of a computing device;
   during the streaming:
      collecting biophysical data of an end user viewing the streaming, and
      responding to ones of the collected biophysical data that indicate a positive reaction by associating a contemporaneously displayed frame of the live video stream with the positive reaction;
   processing each corresponding frame associated with positive feedback by identifying key words presented in text of the feedback to the corresponding frame, wherein the key words of the corresponding frame are determined by:
      parsing the text of the feedback;
      computing a frequency of presence of a set of words in the text;
      selecting as key words only those in the set having a corresponding frequency that exceeds a threshold value; and
      filtering those words in the most frequent set to only those words mapping to one or more profile values of the end user stored in a profile data store;
   matching the identified key words to a tag of an object visually presented in the corresponding frame, wherein the tag includes corresponding meta-information describing the object; and
   storing a reference to the object in connection with the end user as an object of interest for which targeted marketing may be presented.

2. The method of claim 1, wherein the biophysical data is a heartbeat.

3. The method of claim 1, wherein the biophysical data is a facial expression.

4. The method of claim 1, wherein the contemporaneously displayed frame of the live video stream is associated with the positive reaction by applying a time stamp to the positive reaction and correlating the time stamp to a time location in the live video stream.

5. The method of claim 1, further comprising, for the object of interest, image processing the corresponding frame to identify a brand identification of the object of interest and storing the brand identification along with the stored reference to the object in connection with the end user as the object of interest for which targeted marketing may be presented.

6. The method of claim 1, wherein the positive feedback includes textual commentary pertaining to the object provided by one or more other end users.

7. The method of claim 1, wherein the positive feedback includes textual commentary pertaining to the object provided by the end user.

8. The method of claim 1, wherein the biophysical data is an eye gaze of the end user.

9. A data processing system configured for personalized key object detection in a live video stream, the system comprising:
   a host computing platform comprising one or more computers, each with at least one processor;
   a media player executing in the memory of the host computing platform steaming a live video stream; and,
   a computer-readable storage medium communicatively coupled to the at least one processor, the computer-readable storage medium comprising computer program instructions which, when executed by the at least one processor, cause the at least one processor to perform a method comprising:
   during the streaming:
      collecting biophysical data of an end user viewing the streaming, and
      responding to ones of the collected biophysical data that indicate a positive reaction by associating a contemporaneously displayed frame of the live video stream with the positive reaction;
   processing each corresponding frame associated with positive feedback by identifying key words presented in text of the feedback to the corresponding frame, wherein the key words of the corresponding frame are determined by:
      parsing the text of the feedback;
      computing a frequency of presence of a set of words in the text;
      selecting as key words only those in the set having a corresponding frequency that exceeds a threshold value; and
      filtering those words in the most frequent set to only those words mapping to one or more profile values of the end user stored in a profile data store;
   matching the identified key words to a tag of an object visually presented in the corresponding frame, wherein the tag includes corresponding meta-information describing the object; and
   storing a reference to the object in connection with the end user as an object of interest for which targeted marketing may be presented.

10. The system of claim 9, wherein the biophysical data is a heartbeat.

11. The system of claim 9, wherein the biophysical data is a facial expression.

12. The system of claim 9, wherein the contemporaneously displayed frame of the live video stream is associated with the positive reaction by applying a time stamp to the positive reaction and correlating the time stamp to a time location in the live video stream.

13. The system of claim 9, wherein the method performed by the at least one processor further comprises, for the object of interest, image processing the corresponding frame to identify a brand identification of the object of interest and storing the brand identification along with the stored reference to the object in connection with the end user as the object of interest for which targeted marketing may be presented.

14. A computer program product for personalized key object detection in a live video stream, the computer program product comprising a computer readable storage medium having program instructions embodied therewith, wherein the computer readable storage medium is not a transitory signal per se, the program instructions executable by a device to cause the device to perform a method comprising:

streaming a live video stream in a window of a computing device;

during the streaming:

collecting biophysical data of an end user viewing the streaming, and responding to ones of the collected biophysical data that indicate a positive reaction by associating a contemporaneously displayed frame of the live video stream with the positive reaction;

processing each corresponding frame associated with positive feedback by identifying key words presented in text of the feedback to the corresponding frame, wherein the key words of the corresponding frame are determined by:

parsing the text of the feedback;

computing a frequency of presence of a set of words in the text;

selecting as key words only those in the set having a corresponding frequency that exceeds a threshold value; and filtering those words in the most frequent set to only those words mapping to one or more profile values of the end user stored in a profile data store;

matching the identified key words to a tag of an object visually presented in the corresponding frame, wherein the tag includes corresponding meta-information describing the object; and storing a reference to the object in connection with the end user as an object of interest for which targeted marketing may be presented.

15. The computer program product of claim 14, wherein the biophysical data is a heartbeat.

16. The computer program product of claim 14, wherein the biophysical data is a facial expression.

17. The computer program product of claim 14, wherein the contemporaneously displayed frame of the live video stream is associated with the positive reaction by applying a time stamp to the positive reaction and correlating the time stamp to a time location in the live video stream.

18. The computer program product of claim 14, wherein the method further includes, for the object of interest, image processing the corresponding frame to identify a brand identification of the object of interest and storing the brand identification along with the stored reference to the object in connection with the end user as the object of interest for which targeted marketing may be presented.

* * * * *